US009262609B2

(12) United States Patent
Bentley et al.

(10) Patent No.: US 9,262,609 B2
(45) Date of Patent: *Feb. 16, 2016

(54) AUTHENTICATION FREQUENCY AND CHALLENGE TYPE BASED ON ENVIRONMENTAL AND PHYSIOLOGICAL PROPERTIES

(71) Applicant: AVAYA Inc., Basking Ridge, NJ (US)

(72) Inventors: Jon Louis Bentley, New Providence, NJ (US); George William Erhart, Loveland, CO (US); Lawrence O'Gorman, Madison, NJ (US); Michael J. Sammon, Watchung, NJ (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,028

(22) Filed: Mar. 9, 2015

(65) Prior Publication Data
US 2015/0178486 A1      Jun. 25, 2015

Related U.S. Application Data

(60) Division of application No. 12/241,584, filed on Sep. 30, 2008, now Pat. No. 8,978,117, which is a continuation-in-part of application No. 11/942,670, filed on Nov. 19, 2007, now Pat. No. 8,918,079.

(51) Int. Cl.
*G06F 21/00* (2013.01)
*G06F 21/31* (2013.01)
*G06F 21/32* (2013.01)

(52) U.S. Cl.
CPC ............ *G06F 21/31* (2013.01); *G06F 21/32* (2013.01)

(58) Field of Classification Search
USPC ........................................... 726/7
See application file for complete search history.

(56) References Cited

U.S. PATENT DOCUMENTS

| | | | |
|---|---|---|---|
| 5,768,503 | A | 6/1998 | Olkin |
| 6,014,085 | A | 1/2000 | Patel |
| 6,859,651 | B2 | 2/2005 | Gabor |
| 7,024,556 | B1 | 4/2006 | Hadjinikitas et al. |
| 7,120,129 | B2 | 10/2006 | Ayyagari et al. |

(Continued)

OTHER PUBLICATIONS

"Audio-visual multimodal fusion for biometric person authentication and liveness verification"; G Chetty et al; Proceedings of the 2005 NICTA-HCSNet Multimodal user interaction workshop 2006, 8 pages.*

(Continued)

*Primary Examiner* — Jason Lee

(57) ABSTRACT

An apparatus and method are disclosed for determining authentication frequency (i.e., the length of time between authenticating and re-authenticating a user) and challenge type (e.g., username/password, fingerprint recognition, voice recognition, etc.) based on one or more environmental properties (e.g., ambient noise level, ambient luminosity, temperature, etc.), or one or more physiological properties of a user (e.g., heart rate, blood pressure, etc.), or both. Advantageously, the illustrative embodiment enables authentication frequency and challenge type to be adjusted based on the likelihood of malicious activity, as inferred from these properties. In addition, the illustrative embodiment enables the authentication challenge type to be tailored to particular environmental conditions (e.g., noisy environments, dark environments, etc.).

20 Claims, 4 Drawing Sheets

(56) References Cited

U.S. PATENT DOCUMENTS

| | | | |
|---|---|---|---|
| 7,237,024 | B2 | 6/2007 | Toomey |
| 7,577,987 | B2 * | 8/2009 | Mizrah ............... G06F 21/31 726/18 |
| 7,814,324 | B2 * | 10/2010 | Blakley ............... A61B 5/00 340/539.12 |
| 7,860,486 | B2 | 12/2010 | Frank et al. |
| 8,009,121 | B1 * | 8/2011 | Stuart ............... G06F 3/1454 345/1.1 |
| 8,027,665 | B2 | 9/2011 | Frank |
| 8,370,639 | B2 | 2/2013 | Azar et al. |
| 8,584,200 | B2 | 11/2013 | Frank |
| 8,918,079 | B2 | 12/2014 | Bentley et al. |
| 2002/0152034 | A1 | 10/2002 | Kondo et al. |
| 2002/0178359 | A1 | 11/2002 | Baumeister et al. |
| 2004/0006710 | A1 | 1/2004 | Pollutro et al. |
| 2005/0015592 | A1 | 1/2005 | Lin |
| 2005/0097320 | A1 | 5/2005 | Golan et al. |
| 2006/0089125 | A1 | 4/2006 | Frank |
| 2007/0008937 | A1 | 1/2007 | Mody et al. |
| 2007/0250920 | A1 | 10/2007 | Lindsay |
| 2008/0146193 | A1 | 6/2008 | Bentley et al. |
| 2008/0162338 | A1 | 7/2008 | Samuels et al. |
| 2008/0189768 | A1 | 8/2008 | Callahan et al. |
| 2009/0007229 | A1 | 1/2009 | Stokes |
| 2009/0013381 | A1 | 1/2009 | Torvinen et al. |
| 2009/0023422 | A1 | 1/2009 | MacInnis et al. |
| 2009/0183248 | A1 * | 7/2009 | Tuyls ............... H04L 9/3278 726/9 |
| 2009/0198820 | A1 | 8/2009 | Golla et al. |

OTHER PUBLICATIONS

"Enhancing security and privacy in biometrics-based authentication systems"; Ratha et al; IBM systems Journal, 2001; 21 pages.*

Lee, Jason T., "U.S. Appl. No. 12/241,584 Restriction Requirement Feb. 16, 2011", Publisher: USPTO, Published in: US.

Lee, Jason T., "U.S. Appl. No. 12/241,584 Office Action May 9, 2011", Publisher: USPTO, Published in: US.

Patel, Munjalkumar C., "U.S. Appl. No. 11/942,670 Office Action May 13, 2011", Publisher: USPTO, Published in: US.

Patel, Munjalkumar C., "U.S. Appl. No. 11/942,670 Office Action Feb. 3, 2011", Publisher: USPTO, Published in: US.

Patel, Munjalkumar C., "U.S. Appl. No. 11/942,670 Restriction Requirement Oct. 29, 2010", Publisher: USPTO, Published in: US.

G Chetty et al., "Audio-Visual Multimodal Fusion for Biometric Person Authentication and Liveness Verification", Proceedings of the 2005 NICTA-HCSNet Multimodal user Interaction Workshop 2006, 78 pages.

Ratha et al., "Enhancing Security and Privacy in Biometrics-Based Authentification Systems", IBM Systems Journal, 2001, 21 pages.

* cited by examiner

AUTHENTICATION FREQUENCY AND CHALLENGE TYPE BASED ON ENVIRONMENTAL AND PHYSIOLOGICAL PROPERTIES

CROSS-REFERENCE TO RELATED APPLICATIONS

This application is a divisional of U.S. patent application Ser. No. 12/241,584, filed Sep. 30, 2008, which is a continuation-in-part of U.S. patent application Ser. No. 11/942,670, filed 19 Nov. 2007, now U.S. Pat. No. 8,918,079, issued on Dec. 23, 2014, which are incorporated herein by reference in their entirety.

FIELD OF THE INVENTION

The present invention relates to computer security in general, and, more particularly, to authentication.

BACKGROUND OF THE INVENTION

In some instances it is desirable for security reasons to require that the user of a data-processing system (e.g., a wireless telecommunications terminal such as a cellular phone or a smart phone, a personal computer, a server, etc.) be authenticated before the user is permitted to access an application or resource of the data-processing system. Typically a user is presented with an authentication challenge, and the user must supply a valid response to the challenge. Examples of different types of authentication challenges include:
  requiring a user to furnish his or her username and password;
  requiring a user to consult an electronic token device or a list of numbers in order to furnish a one-time password;
  requiring a user to answer a pre-arranged secret question (e.g., "What is your mother's maiden name?", "What was your first telephone number?", etc.); and
  biometrics (e.g., fingerprint recognition, voice recognition, retinal or iris scan, etc.).
Furthermore, in some instances the user of wireless telecommunications terminal 110 might be periodically challenged (i.e., the user is periodically re-authenticated) for greater security.

SUMMARY OF THE INVENTION

The present invention enables authentication frequency (i.e., the length of time between authenticating and re-authenticating a user) and challenge type (e.g., username/password, fingerprint recognition, voice recognition, etc.) to be determined based on one or more environmental properties (e.g., ambient noise level, ambient luminosity, temperature, etc.), or one or more physiological properties of a user (e.g., heart rate, blood pressure, etc.), or both. In accordance with the illustrative embodiment, both current and historical environmental and physiological properties can be used in these determinations.

The present invention is advantageous in that it enables authentication frequency to be increased (i.e., less time between re-authentication challenges, which corresponds to tighter security) and the challenge type to be stronger (i.e., more secure) in situations where it is more likely that a malicious user has gained access to a data-processing system. For example, it might be more likely that a user's wireless telecommunications terminal (e.g., a cell phone, a personal digital assistant [PDA], etc.) is left behind or stolen in an environment with a lot of ambient noise (the theory being that the environment is a public place with a lot of people around). As another example, the authentication frequency and challenge type for an office worker's personal computer might be set for a higher level of security when the office is dark. As yet further examples, authentication frequency and challenge type for a wireless telecommunications terminal might be set for a higher level of security when one or more physiological properties of its user differ substantially from their normal prior ranges, or when the physiological properties indicate that the user might be nervous, or when the environment of the terminal at a particular day and time (say, a weekday morning) differs substantially from the norm.

In addition, the present invention enables the selection of an authentication challenge type that is especially well-suited to a particular situation. For example, a voice recognition challenge might be issued when it is dark, as opposed to a retina scan challenge (because it's dark), or a fingerprint recognition challenge (as it might be difficult for the user to find the fingerprint sensor in the dark). As another example, a challenge/response via a video display and keyboard might be more appropriate than a voice recognition challenge in a noisy environment. As yet another example, when physiological properties of a user suggest that the user is engaged in vigorous exercise, a speaker-independent challenge/response via a speaker and microphone might be more suitable than a display/keyboard challenge (as it is likely difficult for the user to type via keyboard while exercising) or a voice recognition challenge (as the error rate might be high when a user is breathing heavily).

The illustrative embodiment comprises: presenting a first authentication challenge at time $t_1$; and presenting a second authentication challenge at time $t_2$; wherein the magnitude of $t_2-t_1$ is based on an environmental property at one or more instants in time interval $[t_1, t_2]$.

DETAILED DESCRIPTION

For the purposes of the specification and claims, the term "calendrical time" is defined as indicative of one or more of the following:
  (i) a time (e.g., 16:23:58, etc.),
  (ii) one or more temporal designations (e.g., Tuesday, November, etc.),
  (iii) one or more events (e.g., Thanksgiving, John's birthday, etc.), and
  (iv) a time span (e.g., 8:00 PM to 9:00 PM, etc.).

Figure 1:
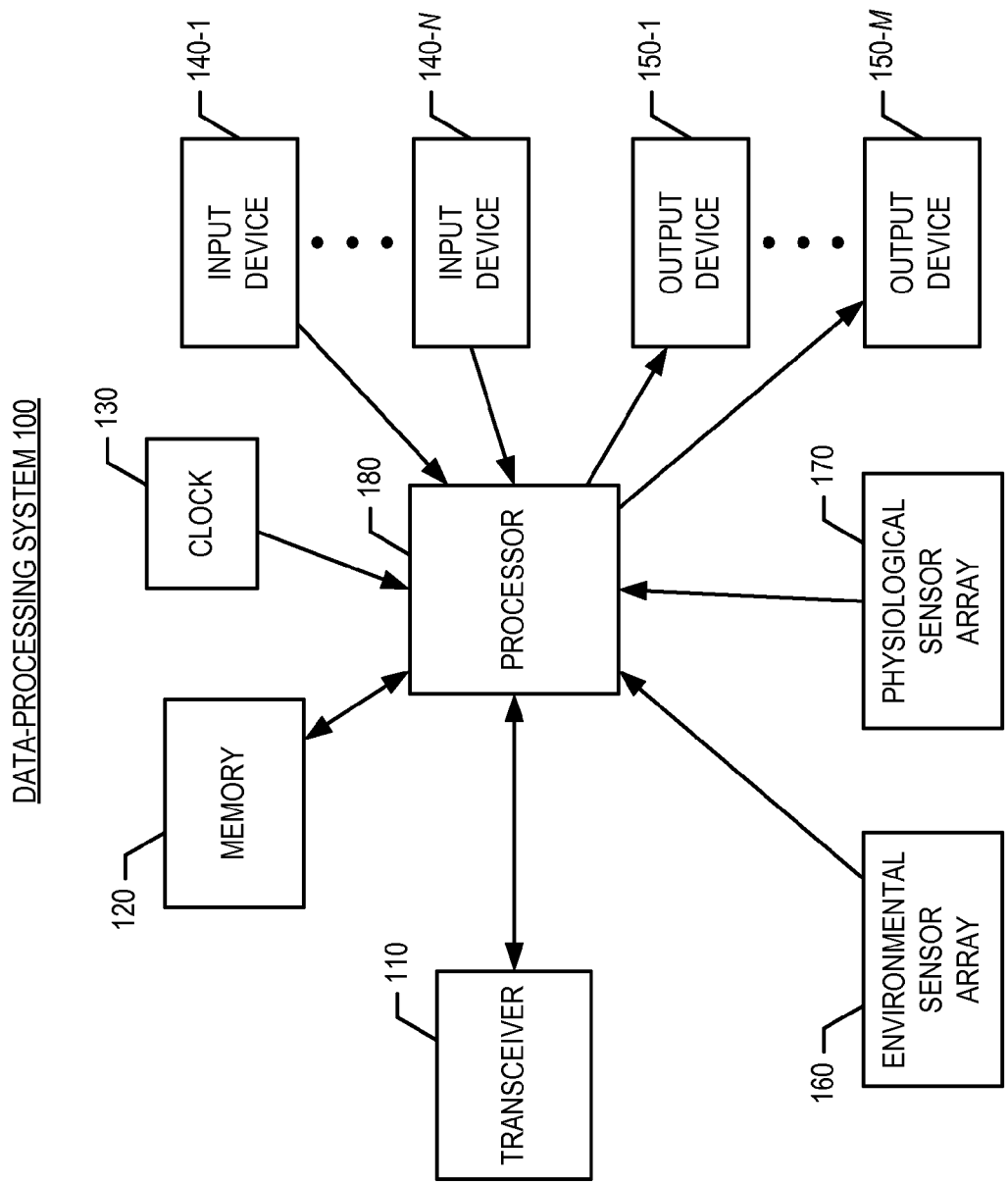
FIG. 1 depicts the salient elements of data-processing system 100, in accordance with the illustrative embodiment of the present invention.

FIG. 1 depicts the salient elements of data-processing system 100, in accordance with the illustrative embodiment of the present invention. As shown in FIG. 1, data-processing system 100 comprises transceiver 110, memory 120, clock 130, input devices 140-1 through 140-N, where N is a positive integer, output devices 150-1 through 150-M, where M is a positive integer, environmental sensor array 160, and physiological sensor array 170, and processor 180, interconnected as shown.

Transceiver 110 is capable of receiving external signals (e.g., via a wired network, via a wireless network, etc.) and forwarding information encoded in these signals to processor 180, and of receiving information from processor 180 and transmitting signals that encode this information (e.g., via a wired network, via a wireless network, etc.), in well-known fashion.

Memory 120 is capable of storing data, program source code, and executable instructions, as is well-known in the art, and might be any combination of random-access memory (RAM), flash memory, disk drive, etc. In accordance with the illustrative embodiment, memory 120 is capable of storing historical environmental and physiological data.

Clock 130 is capable of transmitting the current time, date, and day of the week to processor 180, in well-known fashion.

Input devices 140-1 through 140-N are capable of receiving input from a user and of forwarding the input to processor 180, in well-known fashion. Examples of input devices 140-1 through 140-N might include a numeric keypad, an alphanumeric keyboard, a fingerprint sensor, a microphone, a magnetic card reader, and so forth.

Output devices 150-1 through 150-M are capable of receiving information, including authentication challenges, from processor 180, and of outputting the information to a user, in well-known fashion. Examples of output devices 150-1 through 150-M might include a video display, a speaker, a vibration mechanism, and so forth.

Environmental sensor array 160 is capable of receiving information concerning environmental properties, as is described in detail below and with respect to FIG. 2, and of forwarding this information to processor 180, in well-known fashion.

Physiological sensor array 170 is capable of receiving information concerning a user's physiological properties, as is described in detail below and with respect to FIG. 3, and of forwarding this information to processor 180, in well-known fashion.

Processor 180 is a general-purpose processor that is capable of reading data from and writing data into memory 120, of executing instructions stored in memory 120, and of executing the tasks described below and with respect to FIG. 4. As will be appreciated by those skilled in the art, in some embodiments of the present invention processor 180 might be a special-purpose processor, rather than a general-purpose processor.

Figure 2:
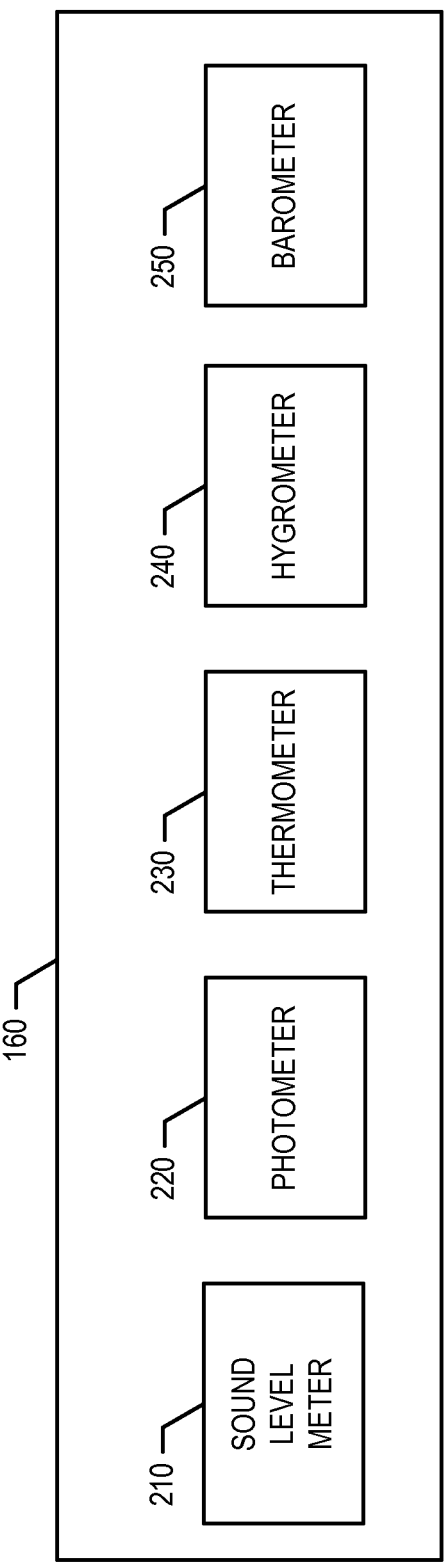
FIG. 2 depicts the salient elements of environmental sensor array 160, as shown in FIG. 1, in accordance with the illustrative embodiment of the present invention.

FIG. 2 depicts the salient elements of environmental sensor array 160, in accordance with the illustrative embodiment of the present invention. Environmental sensor array 160 comprises sound level meter 210, photometer 220, thermometer 230, hygrometer 240, and barometer 250.

Sound level meter 210 measures ambient sound intensity, in well-known fashion, and transmits its measurements to processor 180.

Photometer 220 measures ambient light intensity, in well-known fashion, and transmits its measurements to processor 180.

Thermometer 230 measures ambient temperature, in well-known fashion, and transmits its measurements to processor 180.

Hygrometer 240 measures ambient humidity, in well-known fashion, and transmits its measurements to processor 180.

Barometer 250 measures ambient air pressure, in well-known fashion, and transmits its measurements to processor 180.

Figure 3:
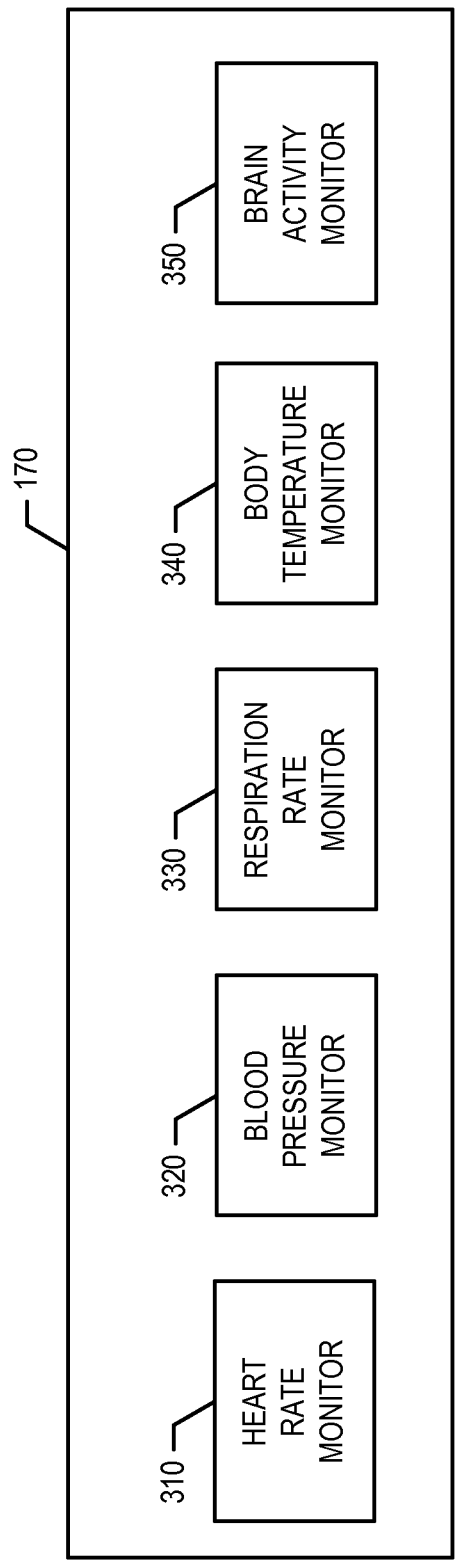
FIG. 3 depicts the salient elements of physiological sensor array 170, as shown in FIG. 1, in accordance with the illustrative embodiment of the present invention.

FIG. 3 depicts the salient elements of physiological sensor array 170, in accordance with the illustrative embodiment of the present invention. An exemplary group of sensors 170, such as a physiological sensor array, can include heart rate monitor 310, blood pressure monitor 320, respiration rate monitor 330, body temperature monitor 340, and brain activity monitor 350. As will be appreciated by those skilled in the art, in some embodiments of the present invention, some or all of the monitors 310, 320, 330, 340, 350 might receive input from the user via one or more sensors that are coupled to the user's body (e.g., via the user's forehead, via one of the user's fingers, etc.) and that transmit data to data-processing system 100, either wirelessly or via a wire. Alternatively, in some other embodiments of the present invention in which data-processing system 100 is a handheld telecommunications terminal, some or all of monitors 210 through 250 might receive input from the user via one or more sensors that are located on the surface of the terminal, and that receive physiological signals from the user when the user is holding the terminal. Moreover, as will be appreciated by those skilled in the art, in some other embodiments of the present invention physiological sensor array might be capable of receiving physiological signals from one or more other persons, either in addition to or instead of the user of data-processing system 100.

Heart rate monitor 210 measures a user's heart rate, in well-known fashion, and transmits its measurements to processor 180.

Blood pressure monitor 220 measures a user's blood pressure, in well-known fashion, and transmits its measurements to processor 180.

Respiration rate monitor 230 measures a user's respiration rate, in well-known fashion, and transmits its measurements to processor 180.

Body temperature monitor 240 measures a user's body temperature, in well-known fashion, and transmits its measurements to processor 180.

Brain activity monitor 250 is a device such as an electro-encephalograph, an electromyograph, etc. that obtains one or more measurements of a user's brain activity and transmits its measurements to processor 180. As will be appreciated by those skilled in the art, in some embodiments of the present invention brain activity monitory 250 might be capable of indicating such conditions as when a user is engaged in deep thought, when a user is engaged in vigorous exercise, when a user is in a stupor, when a user is asleep, and so forth.

As will be appreciated by those skilled in the art, in some embodiments of the present invention physiological sensor array 170 might comprise other kinds of physiological monitors (e.g., an electrocardiograph, a pulse oximeter, etc.) and/or collect other physiological properties (e.g., heart beat, pulse regularity, skin color, etc.) in addition to, or instead of, those depicted in FIG. 3 and described above, and it will be clear to those skilled in the art, after reading this disclosure, how to make and use such embodiments of the present invention.

Figure 4:
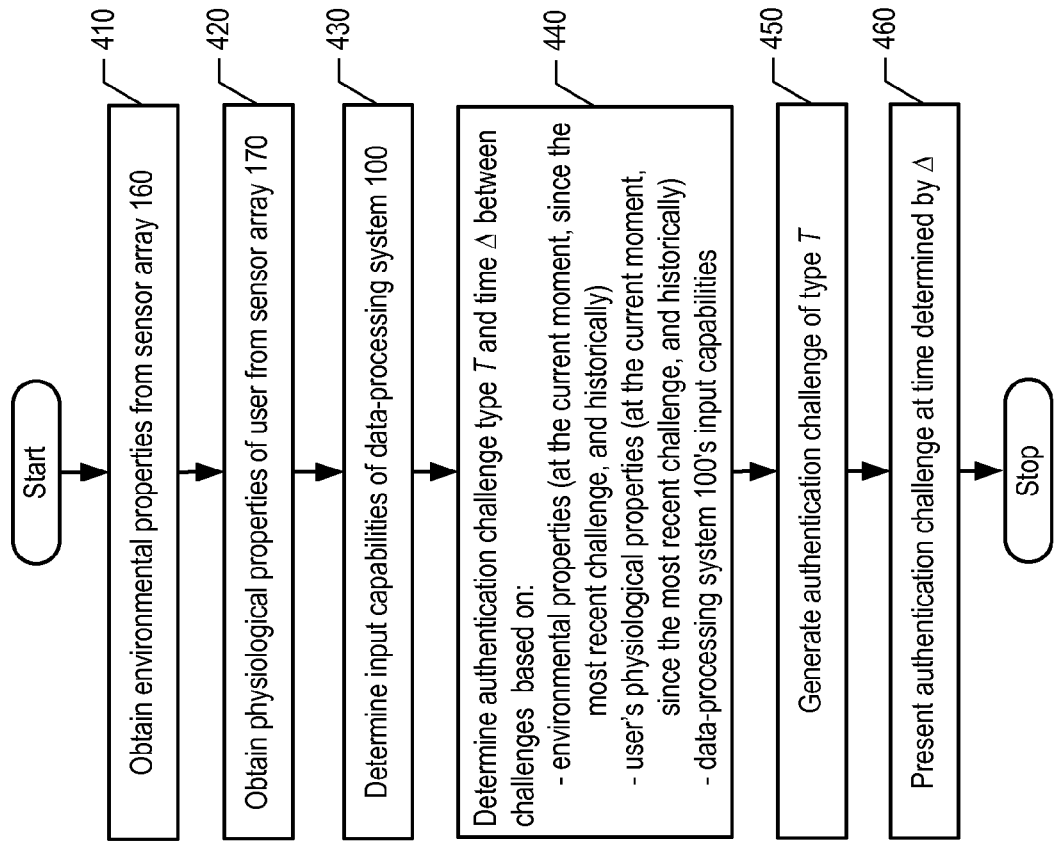
FIG. 4 depicts a flowchart of a method for determining re-authentication challenge frequency and type, in accordance with the illustrative embodiment of the present invention.

FIG. 4 depicts a flowchart of a method for determining re-authentication challenge frequency and type, in accordance with the illustrative embodiment of the present invention. In accordance with the illustrative embodiment, the tasks of FIG. 4 are performed by data-processing system 100. As will be appreciated by those skilled in the art, however, in some other embodiments of the present invention, one or more tasks of FIG. 4, such as the determination of the challenge frequency and type at task 440, might instead be performed by another entity (e.g., an authentication server, etc.) and the result transmitted to transceiver 110 of data-processing system 100.

At task 410, environmental properties at data-processing system 100 are obtained from sensor array 160, in well-known fashion.

At task 420, physiological properties of the user of data-processing system 100 are obtained from sensor array 170, in well-known fashion.

At task 430, the input capabilities of data-processing system 100 are determined. As will be appreciated by those skilled in the art, in embodiments of the present invention in which task 430 is performed by data-processing system 100 itself, data-processing system 100 merely has to check which of input devices 140-1 through 140-N are currently enabled and functional; while in some other embodiments of the present invention, an authentication server or some other entity might transmit a message to data-processing system 100 that explicitly asks for its input capabilities; while in yet some other embodiments, an authentication server or some other entity might transmit a message to data-processing system 100 that asks for its manufacturer and model (e.g., Apple iPhone®, etc.), and then consult a database to determine the input capabilities of data-processing system 100 (under the assumption that all of data-processing system 100's capabilities are currently enabled and functional).

At task 440, an authentication challenge type T and time A between challenges are determined based on:

the current environmental properties at data-processing system 100, environmental properties at data-processing system 100 since the last authentication challenge at data-processing system 100, historical environmental properties associated with data-processing system 100, historical environmental properties associated with data-processing system 100 and the current calendrical time, the current physiological properties of the current user of data-processing system 100, physiological properties of data-processing system 100's user since the last authentication challenge at data-processing system 100, historical physiological properties associated with data-processing system 100, historical physiological properties associated with data-processing system 100 and the current calendrical time, and the input capabilities of data-processing system 100.

As will be appreciated by those skilled in the art, in some embodiments of the present invention, an authentication challenge type might comprise a plurality of successive challenges, rather than a single challenge, thereby enabling even "stronger" authentication challenges. For example, a challenge type determined at task 440 might be "fingerprint recognition, followed by iris scan."

As will further be appreciated by those skilled in the art, for embodiments of the present invention in which task 440 is performed by data-processing system 100, the current day and time might be obtained from clock 130, or might be obtained from an external source via transceiver 110. Moreover, although in the illustrative embodiment historical environmental and physiological property data are stored in memory 120, in some other embodiments of the present invention these data might be stored in an external database and accessed by data-processing system 100 via transceiver 110. As will further be appreciated by those skilled in the art, in some embodiments of the present invention the collection, storing, and organization of these historical data might be performed by data-processing system 100 itself, while in some other embodiments of the present invention some other entity might perform these functions.

As will further be appreciated in the art, in some embodiments of the present invention in which physiological sensor array 170 is capable of receiving signals from one or more other persons in addition to the current user of data-processing system 100, the physiological properties of these other persons might also be considered in the determination of task 440. Similarly, in some other embodiments of the present invention in which physiological sensor array 170 is capable of receiving signals from one or more other persons instead of the current user of data-processing system 100, the physiological properties of at least one of these other persons will be considered in lieu of physiological properties of the current user of data-processing system 100.

At task 450, an authentication challenge of type T is generated, in well-known fashion.

At task 460, the authentication challenge generated at task 450 is presented to the user of data-processing system 100 at a time in accordance with A, in well-known fashion. After task 460, the method of FIG. 4 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    presenting, via a hardware processor, a first authentication challenge on a device at a first time;
    obtaining a measurement of an environmental property associated with the device, at a second time later than the first time; and
    presenting a second authentication challenge on the device at a third time later than the second time, wherein a time interval between the first time and the second time is based on the measurement of the environmental property.

2. The method of claim 1, wherein the time interval is also based on the environmental property measured at a fourth time prior to the first time.

3. The method of claim 1, wherein the environmental property is ambient noise.

4. The method of claim 3, wherein the time interval is configured to decrease as a level of the ambient noise increases.

5. The method of claim 1, wherein the environmental property is ambient luminosity.

6. The method of claim 5, wherein the time interval is configured to decrease as a level of the ambient luminosity decreases.

7. The method of claim 1, wherein the environmental property is ambient air pressure.

8. The method of claim 1, wherein the environmental property is ambient humidity.

9. The method of claim 1, wherein the environmental property is ambient temperature.

10. The method of claim 1, wherein the time interval is configured to increase when the measurement indicates that an environment in which the device is being used is different from a norm.

11. The method of claim 1, wherein an authentication challenge type of the second authentication challenge is determined based on the measurement.

12. The method of claim 11, wherein the environmental property is luminosity, and wherein the authentication challenge type is voice recognition when the measurement is lower than a threshold.

13. A system comprising:

A hardware processor; and a computer-readable storage medium storing instructions which, when executed by the hardware processor, cause the hardware processor to perform operations comprising: presenting a first authentication challenge on a device at a first time; obtaining a measurement of a physiological property associated with a user of the device at a second time later than the first time; and presenting a second authentication challenge on the device at a third time later than the second time, wherein a time interval between the first time and the second time is based on the measurement of the physiological property.

14. The system of claim 13, wherein the time interval is further based on the physiological property measured at a fourth time prior to the first time.

15. The system of claim 13, wherein the physiological property is one of heart rate, blood pressure, body temperature, respiration rate, brain activity, or pulse regularity.

16. The system of claim 13, wherein the time interval is configured to increase when the measurement indicates that the user may be nervous.

17. The system of claim 13, wherein the time interval is configured to increase when the measurement indicates that an environment in which the device is being used is different from a norm.

18. The system of claim 13, wherein an authentication challenge type of the second authentication challenge is determined based on the measurement.

19. A computer-readable storage device storing instructions which, when executed by a hardware processor, cause the hardware processor to perform operations comprising: presenting a first authentication challenge on a device at a first time; obtaining a measurement of an environmental property associated with the device, at a second time later than the first time; and presenting a second authentication challenge on the device at a third time later than the second time, wherein a time interval between the first time and the second time is based on the measurement of the environmental property.

20. The computer-readable storage device of claim 19, wherein the environmental property is at least one of noise, luminosity, humidity, or temperature.

* * * * *